Figure 1:
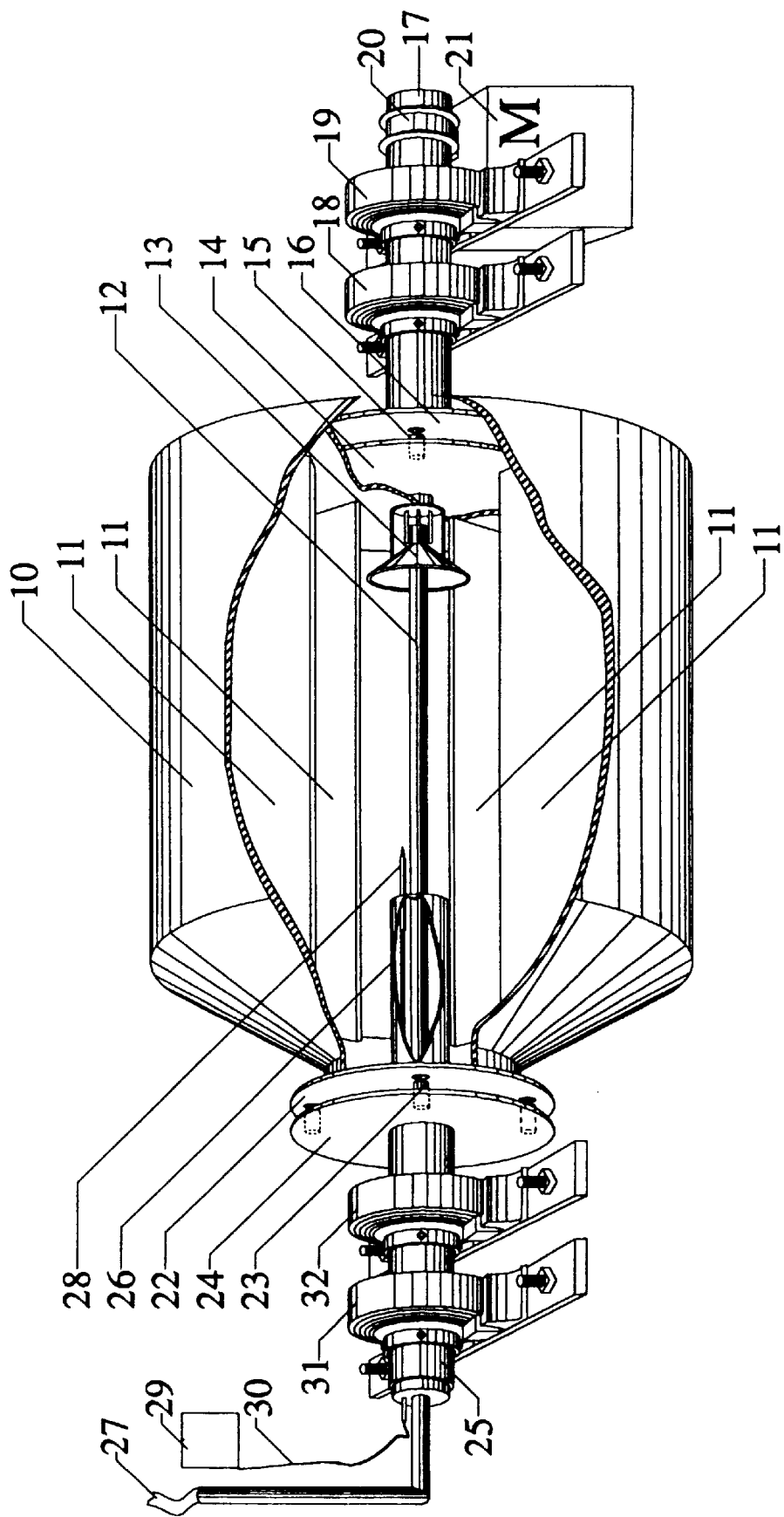

United States Patent
Smith

[11] Patent Number: 5,906,851
[45] Date of Patent: *May 25, 1999

[54] PROCESS FOR IMPROVING BAKING PROPERTIES OF FLOUR

[76] Inventor: Frank D. Smith, 115 Joshua's Way, Eastham, Mass. 02642

[*] Notice: This patent issued on a continued prosecution application filed under 37 CFR 1.53(d), and is subject to the twenty year patent term provisions of 35 U.S.C. 154(a)(2).

[21] Appl. No.: 08/820,556

[22] Filed: Mar. 19, 1997

[51] Int. Cl.$^6$ .................................................. A21D 6/00
[52] U.S. Cl. ........................ 426/465; 426/520; 426/622
[58] Field of Search .................... 426/520, 622, 426/555, 465

[56] References Cited

U.S. PATENT DOCUMENTS

| | | | |
|---|---|---|---|
| 3,428,461 | 2/1969 | Hatton et al. ........................... | 426/555 |
| 3,490,917 | 1/1970 | Doe et al. ............................... | 426/622 |
| 3,974,298 | 8/1976 | Cauvain et al. ........................ | 426/622 |
| 4,157,406 | 6/1979 | Hanamoto et al. ..................... | 426/622 |
| 4,259,362 | 3/1981 | Hanamoto et al. ..................... | 426/622 |
| 5,389,388 | 2/1995 | Gusek ..................................... | 426/622 |
| 5,395,639 | 3/1995 | Chawan et al. ......................... | 426/622 |

FOREIGN PATENT DOCUMENTS

| | | | |
|---|---|---|---|
| 228841 | 1/1925 | United Kingdom ................... | 426/520 |

*Primary Examiner*—George Yeung

[57] ABSTRACT

A process for improving cake baking properties of wheat flour is disclosed. The process includes the steps of introducing a quantity of wheat flour into a container which is provided with mixing devices; heating the wheat flour at a temperature in the range of 110°–140° C. to dry the wheat flour while injecting nitrogen gas into the container, whereby air exposure of the wheat flour is prevented; rotating the container, thereby continuously mixing the wheat flour with the nitrogen gas during the heating step; and cooling the heated flour to 50° C. while preventing air exposure of the heated flour.

4 Claims, 3 Drawing Sheets

PROCESS FOR IMPROVING BAKING PROPERTIES OF FLOUR

BACKGROUND

1. Field of Invention

This invention relates to the heat treatment of unchlorinated flour to make a substitute for chlorinated cake flour.

2. Description of Prior Art

In the United States, cake flour is used in a wide variety of food products. A substantial amount of it is used in making "high ratio" layer cakes. In these cakes, the ratio of sugar to flour is in the order of 1.25 to 1.30. Such high amounts of sugar give cake desirable attributes such as flavor, moistness, lightness, texture and tenderness.

Notwithstanding the acceptance of chlorinated flour in the U.S., chemical treatments and chemical food additives have become suspect and it is desirable to avoid such treatments whenever possible. In addition, most foreign countries prohibit the use of chlorinated cake flour. As a result, those countries do not allow importation of American dry mix products.

Many attempts have been made to develop a substitute for chlorinated flour and a method for preparing such flour. To date, the use of chlorinated cake flour is still widespread and no substitute or method therefor has yet been developed.

Most of the described flour treatments have not been adopted for two primary reasons: First and foremost is the cost. Second is their performance, i.e., the taught methods do not work very well.

Most of the proposed processes have included the heat treatment of unchlorinated flour, or the wheat from which it is made, to improve its baking properties.

For the present purpose, a general review of the heat treatment of flour was made.

The conversion of bread flour to cake flour, by heating for about 1 min. to 17 hrs. at temperatures ranging from 150 to 360° F., is claimed in U.S. Pat. No. 3,428,461, by W. A. Hatton et al. Preferred conditions are 1 hr. at 180° F., in a tray stored in a laboratory convection oven, or 1 hr. at 210° F. in a pressurized blender. Both methods permit extensive exposure of hot flour to air.

In U.S. Pat. No. 3,490,917 by Doe and Russo, either a starch or a flour obtained by air classification of wheat flour is heated 30 mins. at 100 to 120° C. The process is carried out in a screw conveyer equipped with a steam jacket. The inventors stress the need for conditions which permit water vapor to escape. The flour is spread on trays to cool. The recipe in which the flour is used requires additional egg white, in order to equal the baking properties of the chlorinated flour standard.

U.S. Pat. No. 3,974,298, by Cauvain et al., discloses a process for heating wheat 30 mins. at 120° C., or by heating semolina 1 hr. at 100° C., to improve the quality of flour produced by milling. Heat treatment is effected in trays in a laboratory oven, in which there is extensive contact of hot flour and air.

In U.S. Pat. No. 4,157,406 by Hanamoto et al., a laboratory method for cake flour discloses that either unchlorinated flour, that has been heated 1 hr. to 2 wks. at 49 to 93° C., or starch, which has been subjected to swelling, can be substituted for chlorinated flour in high ratio cakes.

In U.S. Pat. No. 4,259,362 also by Hanamoto et al., hard wheat normally used for making bread flour is simultaneously ground and heated. Then it is air classified to obtain a flour suitable for high ratio cakes.

U.S. Pat. No. 5,389,388, by Gusek, discloses a process wherein unchlorinated flour is heated 1 to 2 mins. in a microwave oven at 230 to 270° F. The so-heated flour, when included in dry mixes containing 15% of the emulsifier glycerol monostearate, has baking properties as good as the chlorinated standard. In this process, the considerable contact of hot flour and air is disregarded.

However in U.S. Pat. No 5,395,639, by Chawan et al., the inventors recognize the deleterious effect of exposure of flour to air and devise the following ways to minimize such contact: 1. Coarse grinding reduces the area of the flour; 2. Dough is made immediately after milling; 3. The grinder and the mixer are flushed with nitrogen during those operations.

Since oxidative degradation occurs whenever hot flour is exposed to air, all the taught methods for heat treatment of flour produce unknown amounts of oxidative degradation by-products. These substances adversely affect the baking properties of heat treated flour, HTF and the eating qualities of the cakes derived therefrom.

OBJECTS AND ADVANTAGES

Accordingly, there is a need for a simple and inexpensive process for the heat treatment of unchlorinated flour, to improve the baking properties thereof, so as to realize a substitute for chlorinated cake flour. Such flour should contain a minimum of oxidative degradation by-products.

It is the object of the present invention to provide new and useful techniques for heat treating unchlorinated flour, to improve the baking properties thereof, so as to realize a substitute for halogenated cake flour.

Still another object of the invention is to provide a method for making a non-chemically treated cake flour, which is economically practical.

Still another object of the present invention is to provide methods for heat treatment of unchlorinated flour, for the purposes stated herein, which can be practiced in present industrial equipment.

Still another object of the present invention is to provide a sterile flour with increased shelf life, which is an added advantage of heat treatment.

Still another object of the present invention is to provide methods for heat treatment of unchlorinated flour, so as to produce a cake flour substitute, which exhibits improved baking properties including volume, texture and lack of voids.

DRAWING FIGURES

FIG. 1, shows the apparatus used for heat treatment of flour.

Figure 2:
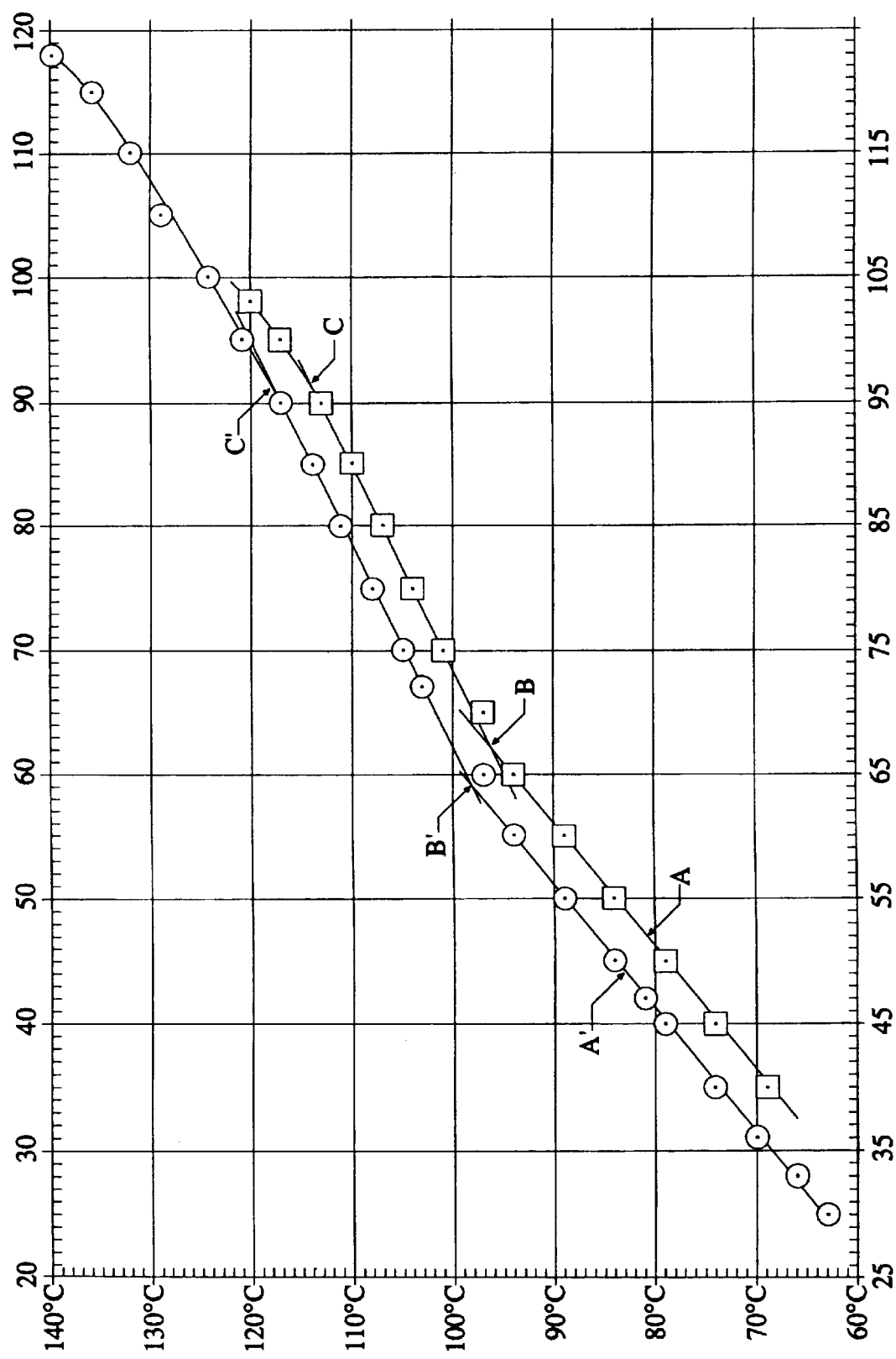

In FIG. 2, a graph of time vs. temperature for 2 heat treatment runs, shows the reproducibility of results.

Figure 3:
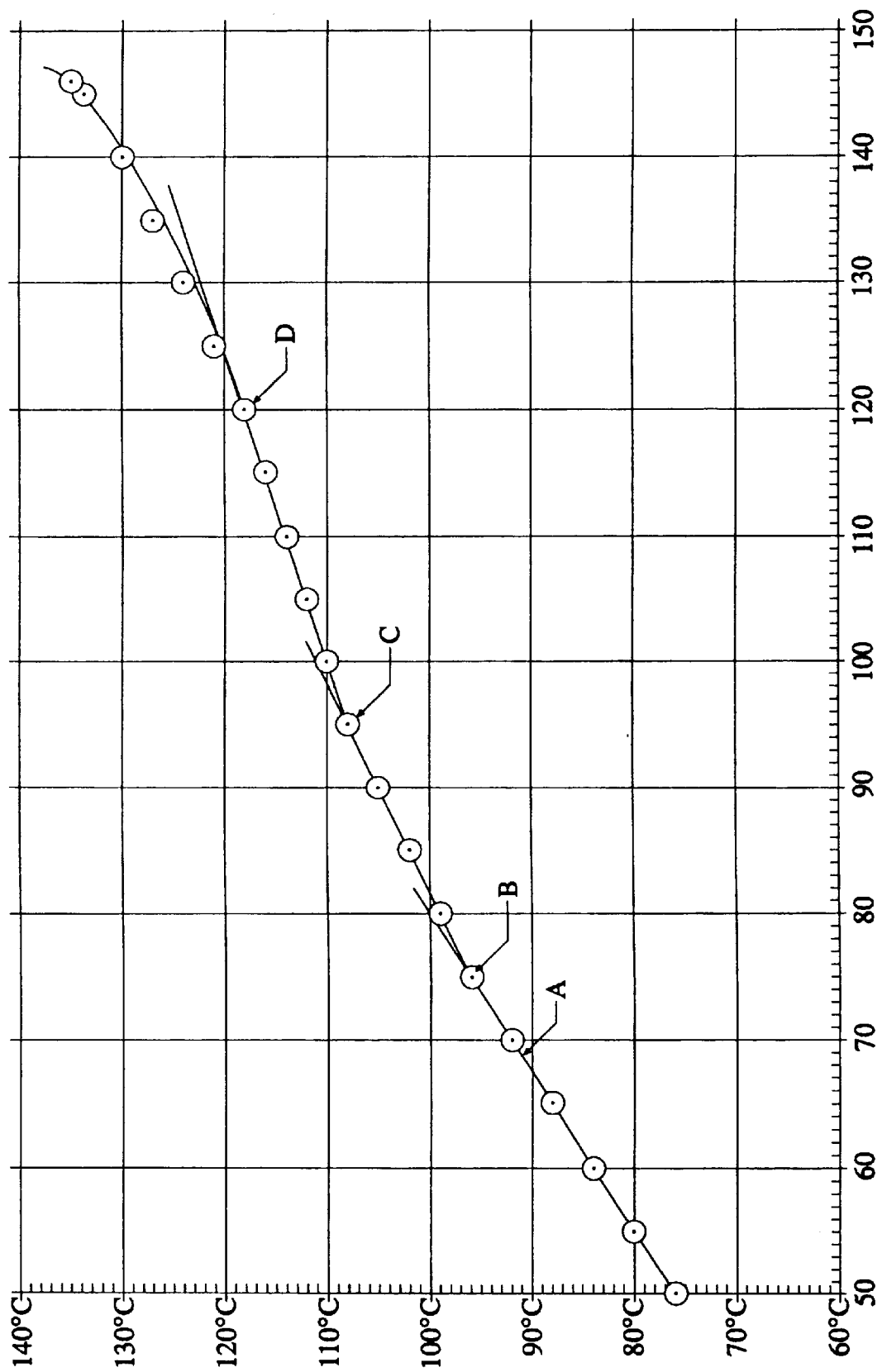

In FIG. 3, a graph of time vs. temperature for heat treatment of bread flour was unusual.

SUMMARY OF THE INVENTION

In its primary aspect, the present invention provides a process for a substitute for chlorinated flour. Either an "all purpose flour" or a "bread flour", treated by process of this invention, gives a HTF with baking properties in high ratio cakes, which are superior to those of chlorinated cake flour.

In another aspect, the invention resides in prevention of contact of hot flour and air, in order to avoid contamination of HTF with oxidative degradation by-products. This requirement has general applicability for all processes which include heating of carbohydrates.

DESCRIPTION OF THE INVENTION

The starting materials are as follows: 1. King Arthur All Purpose Flour; 2. Gold Medal Cake Flour, SOFTASILK; 3. Gold Medal Bread Flour, enriched; 4. CRISCO shortening; 5. Double Acting Baking Powder, Davis; 6. Vanilla extract; 7. Salt; 8. Granulated sugar, all STOP and SHOP brand; Nitrogen, food grade.

In FIG. 1, the pot 10, is fitted with four baffles 11, a stainless steel tube for nitrogen 12 and tube support 13. Attached plate 14, has four projecting pins 15, matching holes in plate 16, which is attached to axle 17, resting on bearings 18 and 19. Pulley 20, connects with variable speed motor 21.

On the other end of the pot, pouring lip 22, has four holes which match pins 23, projecting from plate 24, which is connected to pipe 25, which contains pipe 26 and tube 12. Pipe 26 and tube 12 are connected and free to turn within pipe 25. Tube 12 in connected to nitrogen by polyethylene tubing 27. Temperature probe 28 mounted within pipe 26, is connected by probe wire 30 to electronic unit 29, which monitors flour temperature. The pot is mounted in a LPG fired oven.

To begin, the pot was removed from the oven and charged with 6 to 10 ponds of flour. The apparatus was assembled as shown in FIG. 1.

Throughout the process, the pot was rotated at 32 rpm while being purged with nitrogen flowing at 11./min. After purging 20 mins. the oven was lit. A temperature difference of $(52\pm2)°$ C., between oven and flour temperatures, was quickly established and continued throughout the process. Water and nitrogen escape between the pouring lip 22 and the loose fitting plate 24. When the desired maximum temperature was reached, the oven was turned off, the door opened and a steel plate was inserted between the pot and the oven floor, to aid cooling. Nitrogen flushing was continued until the pot cooled to 50° C.

FIG. 2 shows a plot of flour temperature versus time for 2 heat treatment runs on King Arthur All Purpose Flour. Notice there are 2 time scales, with a 5 min. displacement between them, to avoid overlapping points.

The heat capacity of the flour is constant and a constant temperature relationship of flour and oven is maintained by incremental changes in oven temperature. Therefore the plot of the flour temperature versus time is linear and the magnitude of the slope at point A depends upon the temperature difference between oven and flour.

At point B the evolution of water begins and its evaporation causes a negative inflexion of the plot, which continues until point C, when the moisture begins to diminish. Then a positive curving inflexion begins, which becomes a straight line, after the loss of water. At this point, the time-temperature plot is steeper than the original slope, due to the reduced heat capacity of dehydrated flour. Thus the technique followed for heat treatment of flour in the present invention, offers a method for monitoring the complete dehydration process.

Notice that in the case of bread flour, FIG. 3, there are, inexplicably, 2 negative inflexions, as well as the expected positive one.

Since elimination of water from carbohydrates results in loss of heat capacity, the procedure just described is a new useful procedure for characterizing flour.

Heat treatment of quantities of King Arthur All Purpose Flour reached maximum temperatures of 100° C., 110° C., 120° C., 125° C., 130° C., 135° C. and 140° C. These products were used to make high ratio cakes according to the recipe of Example 1, in which the ratio of sugar to flour is 1.24. These were compared with cakes made from the original flour; GOLD MEDAL CAKE FLOUR, SOFTASILK; heat treated GOLD MEDAL CAKE FLOUR, SOFTASILK; GOLD MEDAL BREAD FLOUR; heat treated GOLD MEDAL BREAD FLOUR. The results are shown in TABLE 1.

| Ingredient | Amount, gms. |
| --- | --- |
| Flour | 116.4* |
| Baking Powder | 4.8 |
| CRISCO | 60.0 |
| Salt | 3.2 |
| Granulated Sugar | 144.8 |
| Egg, Medium | 45.4 |
| Milk | 227 |
| Vanilla Extract | 4.1 |

*In the case of heat treated flours, 104.8 grams (10% less) were used and the ratio of sugar to flour was 1.38.

Cakes were prepared by combining the dry ingredients in a sifter and sifting into a large bowl. Residual crystals of granulated sugar, in the sifter, were crushed with mortar and pestle. Milk, vanilla extract and shortening were added and the ingredients were combined by use of a Sunbeam mixer operating 1.5 mins. on speed No. 1 (about 100 rpm). Then the egg was added and the batter was mixed 1.5 mins. on speed No. 4 (about 400 rpm and labeled "one bowl cakes"). Four hundred and twenty grams of batter were baked 26.5 mins. at 191° C. in an 8-inch round, greased and lined cake pan.

TABLE 1

| | Cake Height, mm, Hot and Cold | | | | |
| --- | --- | --- | --- | --- | --- |
| Example | Center | 1 inch from edge | Center | 1 inch from edge | Comments |
| 1. KING ARTHUR ALL PURPOSE FLOUR | 41 | 24 | 38 | 34 | Cake had a rather nonuniform surface texture but was moist and tender and some what heavy; grainy with voids. |
| 2. K.A.A.P. FLOUR Heat Treated 100° C. | 36 | 32 | 35 | 30 | Cake was tender and moist; heavy with voids and grainy. |
| 3. K.A.A.P. FLOUR Heat Treated 110° C. | 38 | 32 | 37 | 30 | Cake was tender and moist, some what heavy but had no voids. Had a nice surface texture. |

TABLE 1-continued

<table>
<tr><th rowspan="2">Example</th><th colspan="2">Cake Height, mm, Hot and Cold</th><th colspan="2"></th><th rowspan="2">Comments</th></tr>
<tr><th>Center</th><th>1 inch from edge</th><th>Center</th><th>1 inch from edge</th></tr>
<tr><td>4. K.A.A.P. FLOUR Heat Treated 120° C.</td><td>41</td><td>37</td><td>37</td><td>34</td><td>Cake has a beautiful surface texture. It was tender and moist with no voids.</td></tr>
<tr><td>5. K.A.A.P. FLOUR Heat Treated 125° C.</td><td>47</td><td>39</td><td>43</td><td>37</td><td>Cake was tender and moist and had a beautiful surface texture. It had no voids.</td></tr>
<tr><td>6. K.A.A.P. FLOUR Heat Treated 130° C.</td><td>47</td><td>35</td><td>46</td><td>36</td><td>Cake was tender and moist with a beautiful appearance. It had no voids and was exceptionally stable.</td></tr>
<tr><td>7. K.A.A.P. FLOUR Heat Treated 135° C.</td><td>46</td><td>35</td><td>46</td><td>35</td><td>This cake looked just like #6</td></tr>
<tr><td>8. K.A.A.P. FLOUR Heat Treated 140° C.</td><td>45</td><td>38</td><td>45</td><td>36</td><td>This was a good looking cake and it also was quite like #6 and #7 except it was somewhat dry and slightly tough.</td></tr>
<tr><td>9. GOLD MEDAL SOFTASILK CAKE FLOUR</td><td>50</td><td>37</td><td>48</td><td>36</td><td>Cake was tender with a characteristic approximately 5 inch ring around the center, extremely light cake.</td></tr>
<tr><td>10. GOLD MEDAL SOFTASILK Heat Treated 135° C.</td><td>50</td><td>35</td><td>48</td><td>35</td><td>This cake and cake #12 were quite alike in appearance. Cake was tender, moist, without voids and very attractive.</td></tr>
<tr><td>11. GOLD MEDAL ENRICHED BREAD FLOUR</td><td>38</td><td>28</td><td>34</td><td>28</td><td>Cake was grainy and heavy with voids but moist and tender.</td></tr>
<tr><td>12. GOLD MEDAL BREAD FLOUR Heat treated 135° C.</td><td>51</td><td>38</td><td>48</td><td>36</td><td>This cake and #10 were like twins, very attractive, moist and tender, light and without voids.</td></tr>
</table>

TABLE 1 lists the cakes made. Cake heights were measured within 10 seconds after removal from the oven, at the cake center and at a point 1 inch from the edge. These measurements were made again after the cakes were cold.

Examples 1 to 8 are cakes made from King Arthur All Purpose Flour and those made from heat treated K.A. flour. Flours from heat treatment at 100° C. or less give cakes which are inferior in texture, volume and eating qualities to cake made from the original flour. But flour from heat treatment at 110° C. gives a cake with the attractive texture and improved eating qualities which the inventor has come to associate with cakes made from heat treated flour. Flour heat treated to higher temperatures, Examples 4 and 5, produces lighter cakes. Flour heated to 130° C. had the best baking qualities and the cake made therefrom had all of the desirable attributes including tenderness, flavor, moistness, lightness, texture and lack of voids.

Additional heat treatment, Examples 7 and 8, did not improve either the baking properties of the flour, or the eating qualities of the cakes.

Example 9 is the halogenated, bleached and enriched cake flour standard which had a dome-like appearance and an unattractive texture.

Example 10 is the halogenated cake flour standard which was heat treated to 135° C. The eating quality was similar to the standard but it had the nice texture of cakes made from heat treated flour.

Example 11 which was made from bread flour had the worse baking baking properties.

Example 12, which was made from heat treated bread flour, had the best baking properties. It was tender, moist, light and had no voids. Also it had the characteristic beautiful texture imparted by heat treated flour. This flour marks the successful conclusion of the search for a replacement for halogenated cake flour.

SUMMARY, RAMIFICATIONS AND SCOPE

Unchlorinated all purpose flour was heated to various temperatures between 90 and 140° C. Those heated to temperatures between 110 and 140° C., had better high ratio cake baking properties and gave cakes with better eating properties than the original flour. Flour heated to 130° C. was the best flour of the series. Bread flour heated to 135° C. had the best baking properties; better than either heat treated all purpose flour or the chlorinated cake flour standard.

Heat treatment was in all cases carried out in a drum dryer with a nitrogen atmosphere to avoid contamination with oxidative degradation by-products.

What is claimed:

1. A process for improving cake baking properties of wheat flour comprising the following steps:
   (a) introducing a quantity of wheat flour into a container which is provided with mixing means;
   (b) heating the wheat flour at a temperature in the range of 110°–140° C. to dry the wheat flour while injecting nitrogen gas into the container, whereby air exposure of said flour is prevented;
   (c) rotating the container, thereby continuously mixing the wheat flour with the nitrogen gas during the heating step; and
   (d) cooling the heated flour to 50° C. while preventing air exposure of said heated flour.

2. The process of claim 1 wherein said wheat flour is dried by suspending it in the nitrogen gas.

3. The process of claim 1 wherein said flour is either a bread flour or an all purpose flour.

4. A process for making cake flour comprising the following steps:
   (a) introducing a quantity of wheat product either in the form of whole grains or semolina into a container which is provided with mixing means;
   (b) heating the wheat product at a temperature in the range of 110°–140° C. to dry the wheat product while injecting nitrogen gas into the container, whereby air exposure of said wheat product is prevented;
   (c) rotating the container, thereby continuously mixing the wheat product with the nitrogen gas during the heating step;

(d) cooling the heated wheat product to 50° C. while preventing air exposure of said heated wheat product; and (e) milling the cooled wheat product to obtain cake flour.

* * * * *